US008539467B2

(12) United States Patent
Gellerich

(10) Patent No.: US 8,539,467 B2
(45) Date of Patent: Sep. 17, 2013

(54) METHOD AND DATA PROCESSING SYSTEM FOR SOLVING RESOURCE CONFLICTS IN ASSEMBLER PROGRAMS

(75) Inventor: Wolfgang Gellerich, Boehlingen (DE)

(73) Assignee: International Business Machines Corporation, Armonk, NY (US)

( * ) Notice: Subject to any disclaimer, the term of this patent is extended or adjusted under 35 U.S.C. 154(b) by 1846 days.

(21) Appl. No.: 11/685,797

(22) Filed: Mar. 14, 2007

(65) Prior Publication Data

US 2008/0066061 A1 Mar. 13, 2008

(30) Foreign Application Priority Data

Jul. 27, 2006 (EP) .................................. 06117945

(51) Int. Cl.
*G06F 9/45* (2006.01)
(52) U.S. Cl.
USPC .......................................... 717/159; 717/151
(58) Field of Classification Search
None
See application file for complete search history.

(56) References Cited

U.S. PATENT DOCUMENTS

| 5,850,552 A * | 12/1998 | Odani et al. ................. 717/156 |
| 6,209,126 B1 * | 3/2001 | Sasaki et al. ................. 717/125 |
| 6,751,759 B1 * | 6/2004 | Sun et al. .......................... 714/55 |
| 7,069,555 B1 * | 6/2006 | Tzen ............................. 718/102 |
| 2004/0123072 A1 * | 6/2004 | Kailas et al. ..................... 712/23 |
| 2004/0250050 A1 * | 12/2004 | Ludden et al. ................. 712/218 |
| 2005/0216899 A1 * | 9/2005 | Muthukumar et al. ........ 717/151 |

OTHER PUBLICATIONS

H.S. Warren, Jr. "Instruction Scheduling for IBM RISC System/6000 Processor", Jan. 1990, IBM J. Res. Develop. vol. 34, No. 1, pp. 85-92.*
Smotherman et al. "Efficient DAG Construction and Heuristic Calculation for Instruction Scheduling", 1991, Proceedings of the 24th annual international symposium on Microarchitecture, pp. 93-102.*
Liao et al. "Code Optimization Techniques for Embedded DSP Microprocessors", 1995, 32nd ACM/IEEE Design Automation Conference.*

* cited by examiner

*Primary Examiner* — Chat Do
*Assistant Examiner* — Jue Wang
(74) *Attorney, Agent, or Firm* — Cantor Colburn LLP; Dennis Jung

(57) ABSTRACT

Embodiments relate to solving conflicts in assembler programs. An aspect includes generating an internal representation of the control flow of the source code of the assembler program, the internal representation including nodes for every instruction and a directed edge for every possible flow of control between nodes. Data attributes are attributed to the nodes and/or the edges to store the information about whether the resource used by an instruction is available or for which amount of time is unavailable. A data-flow analysis is the applied to the internal representation of the control flow of the source code to determine whether the resource used by an instruction of the assembler program is available or for which amount of time is unavailable. Each node is checked for whether the instruction accesses a resource which is unavailable. An appropriate action is then taken to overcome the resource conflict.

17 Claims, 4 Drawing Sheets

INST1 R1
INST_X
INST_Y
INST2 R1
FIG.4A
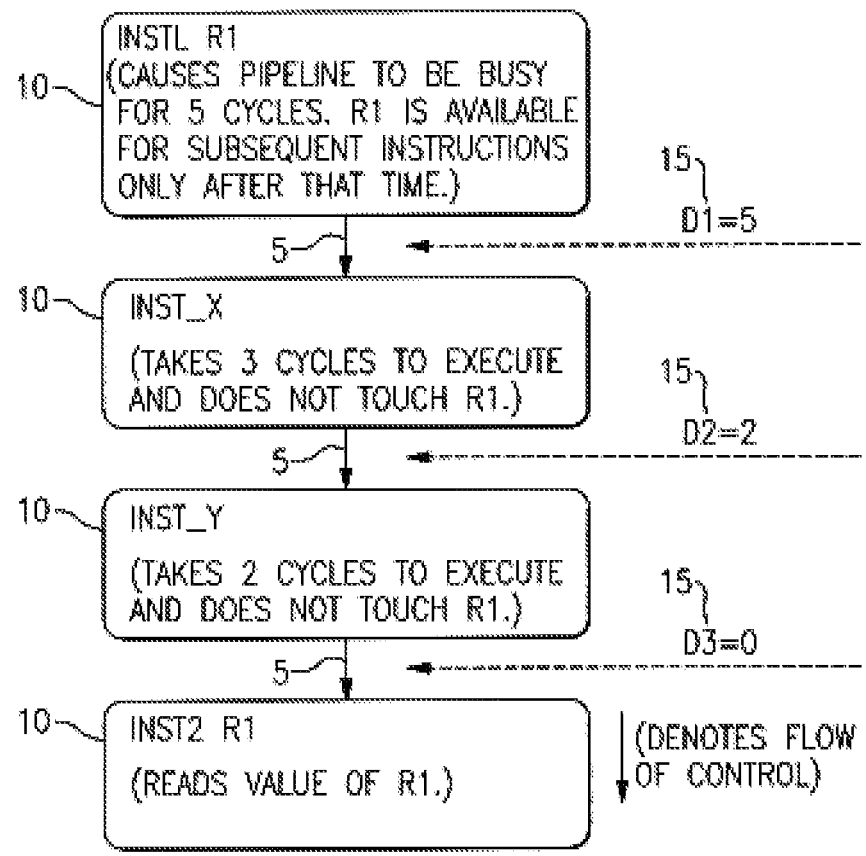
FIG.4B
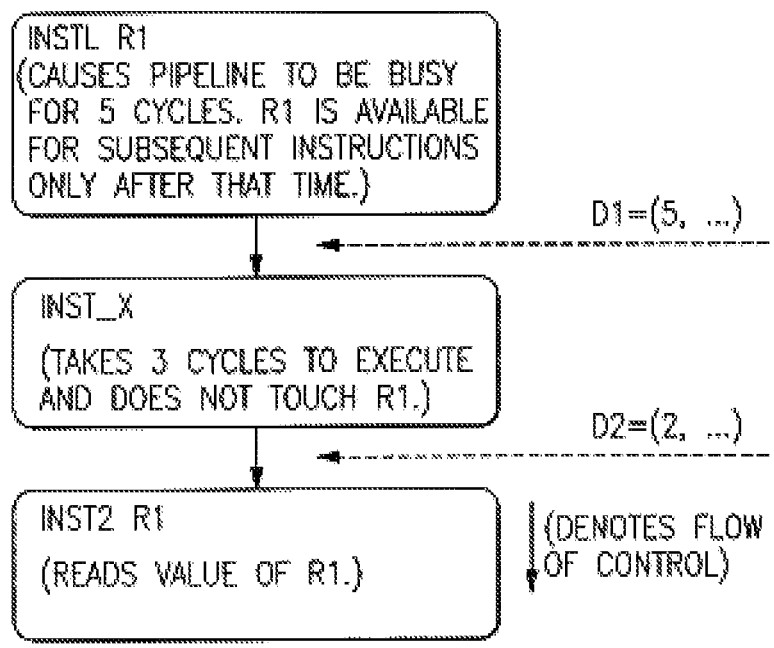
FIG.5

METHOD AND DATA PROCESSING SYSTEM FOR SOLVING RESOURCE CONFLICTS IN ASSEMBLER PROGRAMS

FIELD OF THE INVENTION

The invention relates to a method and data processing system for solving resource conflicts in assembler programs whereby the cause of the resource conflicts is an access to a currently unavailable resource.

DESCRIPTION AND DISADVANTAGES OF PRIOR ART

Today, most programming is done using a so-called higher-level programming language like C or Java. Programs developed using such a language are translated into machine-executable format by using a compiler. However, there remain many application areas where programs must still be developed in assembler language. Examples for such areas are hardware-oriented programs like hardware device drivers, the implementation of complex instructions within a processor, or the software layer between the hardware of a computer and an operating system.

A typical example for today's application of assembler programming is the Millicode found on the IBM zSeries computer system.

Any computer program can contain errors (e.g., resource conflicts). Prior art for finding such resource conflicts are human activities like testing and doing code reviews. Performing tests can be supported by simulators that help to identify the location of a problem. These techniques are used for both, programs written in higher-level programming languages and in assembler. Additionally, there are automated tools for finding problems in higher-level programming language source code. These tools apply techniques summarized under the term static program analysis. The value of such tools is that they run automatically, and that they tend to find problems that are likely to get missed by tests and reviews.

One important algorithm used for static program analysis is data-flow analysis which iteratively solves a set of data-flow equations in order to derive information later used for detecting bugs. Data-flow analysis applies a mathematical model based on an arithmetic structure named lattice. This approach was first published in the early 1970ies; throughout this text we will refer to a contemporary textbook, Steven S. Muchnik: Compiler Design and Implementation, Morgan Kaufman Publishers, 1997, ISBN 1-55860-320-4 and also use their terminology.

Assembler programming is more difficult and error-prone than program development using a higher-level programming language in that they may suffer from resource conflicts that are specific to assembler programming. These resource conflicts are not possible when using a higher-level programming language. One principal source or resource conflicts comes from the fact that the abstraction level of assembler programs is very low. Any control structures or structured data types provided by higher-level programming languages are lacking. A second source of resource conflicts stems from the fact that assembler programming is always very close to the hardware being programmed.

A typical resource conflict of that kind is to access a resource of the hardware that is currently not available or busy or being updated by an ongoing operation. An example for such problems is to read a value from a hardware register for which a new value is currently being calculated. This situation typically occurs when the processor used pipelined execution. This technique is commonly used by many processors today.

The general principle of pipelined execution is that the execution of a machine instruction is split into, for example, five steps. These steps may be (1) decode the instruction opcode, (2) evaluate the instruction operand address, (3) fetch the operand value, (4) execute the operation, (5) write the result back. The processor provides hardware that can perform all these five different tasks in parallel. The typical usage of a pipeline is to feed consecutive instructions into the pipeline which then performs the five steps for every instruction. The key issue here is that the execution of the instructions overlap. At one point of execution, the first instruction that was fed into the pipeline may be in step 5, the second instruction that was fed immediately after the first one is in step 4, and so on. Since the processor provides hardware for every step, the execution of all steps overlap in time thus saving a lot of execution time. Pipelined execution has much in common with an assembly line in a factory.

However, one problem related to pipelined execution is that the result of an instruction fed into the pipeline is only available after the instruction passed through all stages of the pipeline, i.e., after five cycles in the above example, FIGS. 1 and 2 give an example of an assembler program with and without this problem, respectively.

FIG. 1 shows an example of a linear instruction sequence. The execution of $Inst_1$ computes some value and stores it into register $R_1$. The execution involves using a pipeline which delivers a result only after five cycles. Trying to read the value of $R_1$ earlier is an error as the desired value has not been stored. Depending on the particular hardware, such a read operation might yield the former value of $R_1$, or the result might be totally unpredictable. Fortunately, there are two other instructions, $Inst_x$ and $Inst_y$, before instruction $Inst_1$ finally reads $R_1$. Executing $Inst_x$ and $Inst_y$ takes two and three cycles, respectively, so the pipeline completed the write operation to $R_1$ early enough.

This is not the case in the second example shown in FIG. 2. In this example, the write and read instructions are only separated by an instruction taking three cycles. The execution of this instruction sequence suffers from an appropriate execution separation and would lead to erroneous results. To summarize, the instruction $Inst_1$ must only access register $R_1$ after instruction $Inst_1$ has completed the calculation of a new value for $R_1$. The time needed for doing so, five cycles in the example, is named execution separation.

It is important to note that the general resource conflict of accessing an unavailable resource in assembler programs is not limited to the example of pipeline execution. The resource conflicts addressed with the present invention includes:

registers for which a new value is computed and the computation is not done as one atomic step but takes several machine cycles, calculations performed using a pipeline. Here, the problem is that one instruction starts the calculation but the pipeline will produce the result only after several machine cycles, any functional unit within a processor on which an operation is started by one instruction, and the result is available only after several machine cycles, any functional unit not belonging to the processor but being part of the computer system to which the processor belongs on which an operation is started by one instruction, and the result is available only after several machine cycles, and any functional unit within the processor or within the computer system to which the processor belongs on which some instructions can trigger an operation which takes several machine cycles, and where the functional unit has the limitation that it cannot accept certain other requests during this time. (Note that the difference to the previous item is that the functional unit is simply busy and is unavailable for other operations just for this reason and not because the other operations would wait for a result.)

Prior art for finding such resource conflicts is either doing code reviews or extensive testing, possibly with the aid of simulators. Code reviews are, however, expensive and problems of this kind are easily missed. Testing will find the problem only if there is a test case that triggers the erroneous situation. In general, it is the case that the control flow does not just flow straight forward but has plenty of branches, forward jumps and backward jumps. Also, the test ease must be designed such that its output depends on the erroneous resource access. Using a simulation tool to run the test cases makes the situation somewhat easier as the simulator can perform checks that will detect and report the erroneous access immediately. The disadvantage of this approach is the slow execution time of simulators. Also, the problem persists that there must be a test case triggering the erroneous situation.

There are also some approaches to prevent resource conflicts by some hardware means that would delay the execution of an instruction until the resources it accesses are available. In the case of problems with values to be computed by a pipeline as in the example described above, this mechanism is known as hardware interlock. In the case of the code example shown in FIG. 2, a hardware interlock mechanism would delay instruction Inst2 for two cycles.

In general, mechanisms like hardware interlocking can prevent resource conflicts. One disadvantage is, however, the additional hardware effort as the interlock mechanism will consume hardware resources like chip area. Also, the interlocking mechanism will introduce performance penalties: delaying an instruction implies that the processor is idle during that time. With respect to performance, the detection of resource conflicts is still important, even if hardware interlocks guarantee correct results.

There is some other work related to program analysis:
Recently, the so-called post-pass optimization has been introduced into compiler construction. This technique consists of an additional optimization pass after the whole program has been compiled and linked, i.e., the input to the post-pass optimizer is a binary. The advantage of this final pass is that all information is complete, while the compiler usually only operates on parts of the whole program. Post-pass optimizations seem to be most popular for single-chip controllers and similar projects that do not apply dynamic linking. Post-pass optimization may well apply techniques like data-flow analysis to gather information that is later used to decide on certain coda optimizations. Post-pass optimization does, however, not try to find problems. In contrast, given that the input is generated by a compiler, it is considered correct. Post-pass optimization is an optimization technique, seeking reduce the run-time and/or space needed by a program, but it is not a software engineering tool.

Currently available techniques of static code analysis are applied to high-level programming but cannot find resource conflicts in assembler programs.

There are tools which build a control flow graph for assembler programs and provide an interface which allows the user to query some properties of the code. This approach does, however, not apply data-flow techniques. The "related work" section of this paper describes a number of similar tools none of which is similar to the invention.

There is an approach to re-engineer legacy assembler programs yielding high-level source code. The approach translates assembler code into an internal representation and applies several analysis to it. This included data-flow analysis, but only to detect possible bodies of subroutines. The suggested tool does not check assembler programs for correctness.

OBJECT OF THE PRESENT INVENTION

It is object of the present invention to provide a method and data processing system for solving resource conflict in assembler programs by avoiding the disadvantages of the prior art as described above.

SUMMARY OF THE INVENTION

The present invention provides a method/data processing system for solving resource conflicts in assembler programs which is characterized by the steps of:
a) Generating internal representation of control flow of the source code of the assembler program by using standard techniques of compiler constructions, wherein said internal representation contains nodes for every instruction of found in said source code and a directed edge for every possible flow of control between nodes,
b) Attributing data attributes to said nodes and/or said edges, wherein said data attributes are used to store the information whether the hardware resource used by at least one instruction of said assembler program is available or for which amount of time is unavailable,
c) Applying a data-flow analysis method to said internal representation of the control flow of the source code for determining whether the hardware resource used by at least one instruction of said assembler program is available or for which amount of time is unavailable comprising:
c1) initializing all of said attributes of said internal representation of the control flow of the source code with an initial value,
c2) providing access to the following input parameters:
execution time of said instruction associated to said node,
information what hardware resource is used by said instruction,
and all attributes of the nodes from which a directed edge to said node for the attribute is currently being calculated,
c3) calculating for each of the node a real value for said attribute associated to said node based on said parameters,
c4) repeating calculating step in III) until for all attributes the newly computed real value remains unchanged,
d) checking for each node whether the instruction accesses a resource which is nod available, wherein unavailable hardware resources represents a resource conflict, and
e) taking an appropriate action in order to overcome said resource conflict.

A further embodiment of the invention is the analysis of performance problems that occur on processors which support hardware interlocking. Here, none of the access conflicts would lead to incorrect results but rather slow down the execution. Currently, such effects are detected by hardware monitoring. The method as described in the present invention gives more complete results in that the detection of a performance problem would no longer depend on the availability of an appropriate test case.

A further embodiment of the present invention is easily extended to check more than just one resource (e.g. set of resources).

A further embodiment at the present invention is to use techniques which are known to improve the representation of the CFG with respect to execution time and/or space. One approach is that nodes do not contain single instructions but so-called basic blocks which consist of a linear sequence of instructions which does not have any branches internally. This representation is also appropriate to model superscalar execution. The flow function would be modified not to take care for single instructions, but for those sequences of instructions which are executed in parallel.

A further embodiment of the present invention provides an optimization of the CFG representation by using the static single assignment form (SSA). This technique reduces the overhead for propagating data-flow information through the CFG.

A further embodiment of the present invention uses an additional function. The checking function could trace the calculation of data-flow information and output possible flows of execution that lead to an error message. This would help users locating the problem.

In a preferred embodiment of the present invention the internal representation of the control flow of toe source code is represented in a form of control flow graph. The nodes in control flow graph may represent basic blocks which summarize the sequence of instructions which will be executed by the control flow in a linear sequence.

In a further embodiment of the present invention the internal representation of the control flow of the source code is constructed according to the principles of static single assignment form.

In a preferred embodiment of the present invention the initial value of the attribute is 0.

In a further embodiment of the present invention the calculation is based on the equations in claim 5.

In further embodiment of the present invention the action to be taken is present the problem to user by a user interface.

In a further embodiment of the present invention the resource conflict is presented by the line number of the instruction to the developer.

In a further embodiment the calculation of said real values additionally records which instruction is the reason why a certain resource is unavailable and provides that information in addition to resource conflict report.

In a further embodiment of the present invention the action to be taken is an automatic correction mechanism for repairing the conflict.

In embodiment of the automatic correction mechanism additionally inserts an instruction which delays the execution of the instruction identified as a resource conflict for sufficiently long time to solve the resource conflict.

Another embodiment of the automatic correction mechanism inserts another instruction from the assembler program if it fulfils following requirements: it belongs to the assembler program, does not use the resource whose unavailability causes the conflict, and moving of the instruction does not change the semantics of the assembler program.

BRIEF DESCRIPTION OF THE DRAWINGS

In the following, preferred embodiments of the invention will be described in greater detail by making reference to the drawings in which:

FIG. 4*a* shows an example of a correct assembler program, FIG. 4*b* shows the control-flow graph for the example assembler program given in FIG. 4*a*. The control-flow graph is annotated with data-flow information, FIG. 5 shows the control-flow graph for an example assembler program that suffers from an access to unavailable resource. The control-flow graph is annotated with data-flow information.

DETAILED DESCRIPTION

Figure 3:
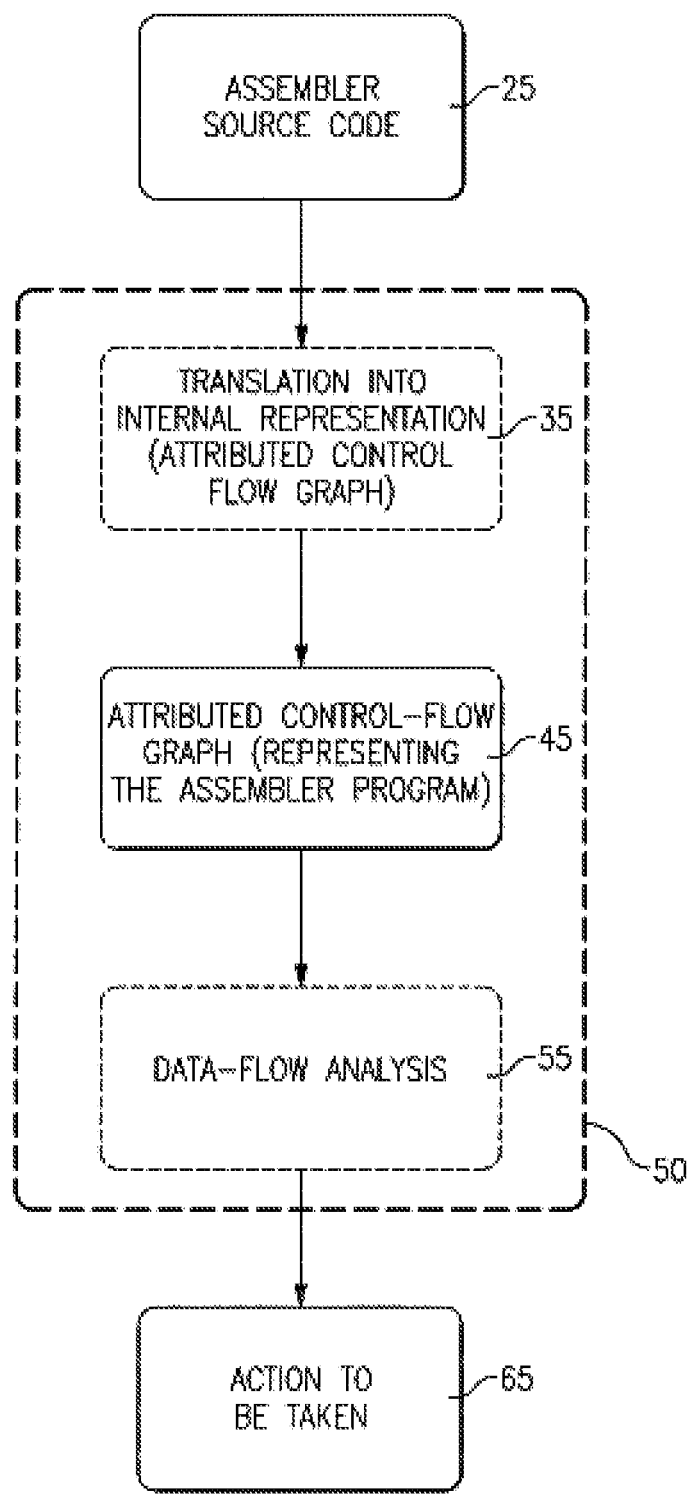
FIG. 3 shows a block diagram demonstrating the overall application of the invention and its major components.

FIG. 3 shows a block diagram of a data processing system according to the present invention. The data processing system runs an analysing tool 50 for analysing resource conflicts which implements the present invention. A method for solving resource conflicts accomplished by the analysing tool 50 is done using the following steps: Initially, the assembler program to be checked is available in source code form, e.g., as a text (25).

1. The next step is to read this text (see FIG. 4*a*) and translate the program into an internal representation which has the form of a control-flow graph (35; see FIG. 4*b*). This translation process is done using standard programming techniques like scanning and parsing which are known in the field of compiler construction (Compiler construction tools like e.g. "flex" and "bison" can he used to implement the code performing the translation.). The control-flow graph contains one node (10) for every instruction found in the assembler program and a directed edge (5) for every possible flow of control.

2. The control-flow graph is annotated with data attributes D 1 to D 3 (15). These attributes are used to store the information for which amount of time a certain resource will remain unavailable. If the data attribute equals zero for a certain instruction, then the resource in question is available. If the data attribute has some other value, then it is not available for the particular instruction (45).

3. Next, the data-flow analysis algorithm modified according to the invention performs the following steps (55);

4.1 It initializes these data attributes with the initial value 0. This value reflects the fact that all resources are available upon program start and that the algorithm has not yet derived information about the unavailability of resources.

4.2 The real values of the data attributes are calculated using an iterative algorithm for solving data-flow equations.

(a) Data-flow equation previously used in other application areas (e.g., for analyzing high-level programs) are replaced. The new equations model the behavior of assembler program execution with respect to the problem of unavailable resources. In particular, the new equations reflect the following cases: (a1) if a resource is marked to be unavailable for the next D cycles and the next instruction INST to be executed takes c cycles, calculate the difference D−c. If the difference is less than zero, the resource is marked available by assigning the value zero to the data attribute. Otherwise, the resource will remain unavailable for D−c cycles after the execution of INST, i.e., the value D−c is assigned to the data attribute.

(a2) If an instruction INST will cause the resource to become unavailable for c cycles, the value of the data attribute after INST will be c.

The information about the execution time (usually measured in machine cycles) for every instruction is taken from the manufacturer's description of the processor. The information which information an instruction uses is either taken from that description, too, or is available from the assembler source code.

This informal description is given more precise in the form of some equations below. These equations are based on a modified flow-function, a modified meet-operator, and a modified in-function which are explained below in detail.

(b) The iterative process of calculating the real values for the data attributes applies the data-flow equations described in (a). The algorithm consists of the following steps:

STEP1: assign the value 0 to variable C.
STEP2: calculate the new value for every data attribute by evaluating every data-flow equation. If the new value is different to the former value for at least one data attribute, assign the value 1 to variable C. The equations can be evaluated in any order.
STEP3: If variable C equals 1, then continue with STEP1. Otherwise, the data attributes now contain the final values.

Some mathematical properties (to be given below) of the procedure described in 4.1 and 4.2 guarantee that the procedure will finally terminate with correct results.

4.3 After having calculated the real values of the data attributes, the invention checks for every instruction whether it accesses a resource which is not available at that point.

4.4 For all instructions suffering from this problem, an action to be taken, e.g. error message is reported to the user or a automatic correction mechanism, is generated by the analysing tool (65).

The iterative procedure that is common to all previous applications of data-flow analysis is also used by the present invention. Additionally, the invention contains the following new functional components that are needed to calculate the unavailability of resources:

A new flow-function that reflects the following properties of every possible assembler instruction: (1) the instruction's properties with respect to execution time and (2) whether the instruction will cause a resources to become busy for a certain time.

a) The meet-operation is defined such that it combines the data-flow information associated with uniting flows of control in a way that yields a conservative estimation of the usage of the hardware resources to foe checked.
  b) An in-function is defined for every node in a way that it combines the data-flow information reaching via all incoming control-flow edges in a way that yields a conservative estimation of the usage of the hardware resources to be checked. This combination of the information associated with incoming edges is performed by means of a newly defined meet-operator.

The following sections describe the algorithm in detail, starting with an extended example and finally verifying is formal correctness.

Figure 1:
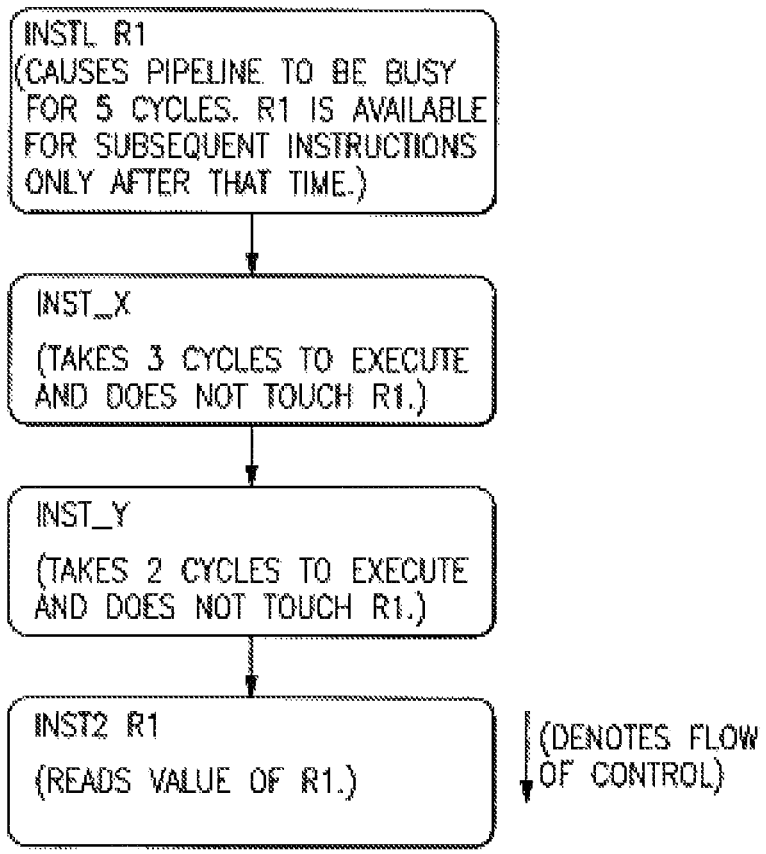
FIG. 1 shows an example assembler program that has no resource conflicts that were caused by accesses to unavailable resources.
Figure 2:
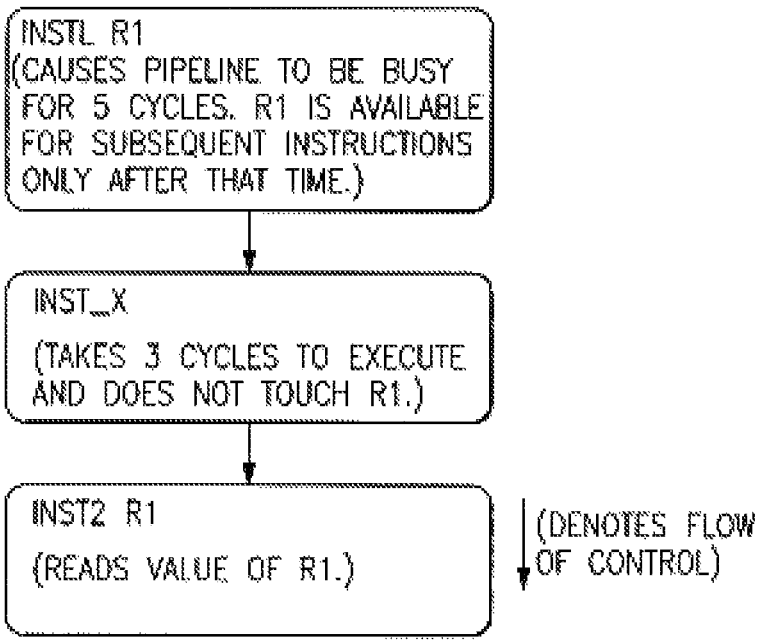
FIG. 2 shows an example assembler program that suffers from an access to an unavailable resource.

FIGS. 4b and 5 continue the example that began in the section "Description and disadvantages of prior art" and used FIGS. 1 and 2, respectively. Compared to these two FIGS., the control-flow graphs shown in FIGS. 4b and 5 are annotated with the data-flow information referred to in steps 3. These additional data fields are named data attributes. It represents the information "for how many cycles will register R1 remain unavailable" that was given informally in the introductory example. In general, a data attribute can have as many entries as the application requires. The example uses just one entry which refers to register R1.

When following the possible flow of control from the first instruction to the subsequent instructions, the data-flow information must reflect the ongoing program execution. For example, as the flow of control moved from reaches instruction InstX, this instruction gets executed which takes 3 machine cycles. Before this instruction was executed, register R1 was known to be unavailable for the next 5 cycles. After the execution of InstX took 3 cycles, the register R1 is unavailable only for the next 2 cycles. The data-flow analysis algorithm applied by the invention calculates the value of such data-flow information that is valid at the beginning of every instruction. The information how many cycles the execution of a certain instruction takes is represented by the above-mentioned flow-function. To calculate the data-flow information valid at the beginning of instruction InstY, the algorithm needs to know the data-flow information valid at the beginning of instruction InstX which it combines with the flow-function in order to learn how this information is modified by the execution of InstX.

Figure 6:
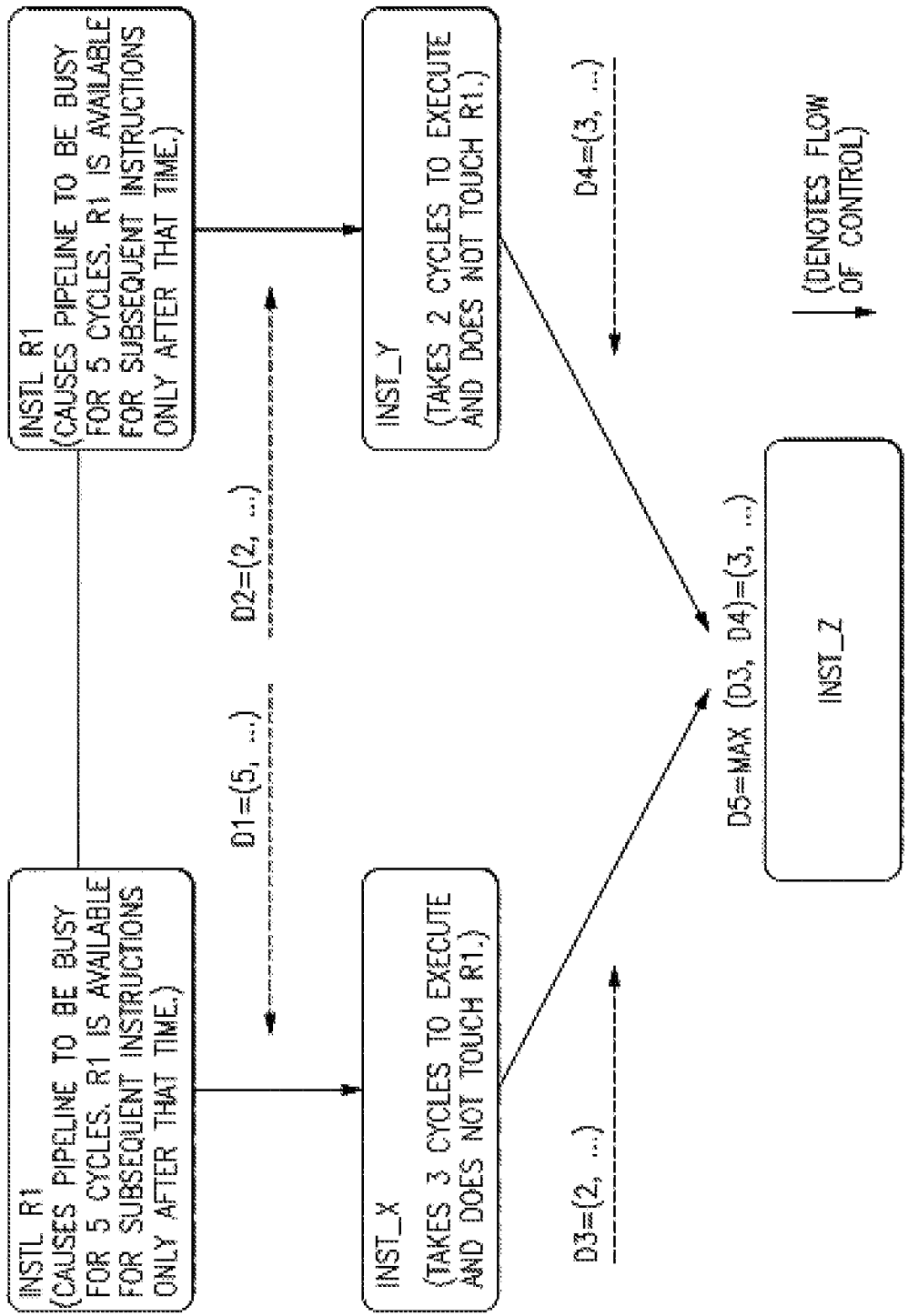
FIG. 6 shows the control-flow graph for an example assembler program that has two joining control flow paths and is annotated with data-flow information.

In general, programs are not restricted to linear sequences only. FIG. 6 shows an example control-flow graph with two possible flows of control joining at node InstZ. The data attributes associated with the joining edges must be combined in some way. For the intended correctness check it is appropriate to make a worst-case assumption. The data attribute resulting from some joining edges therefore contains the maximum value. In the example, the flow of control may either come from InstX or from InstY. The register R1 is unavailable for the next 2 or 3 cycles, respectively. Since both paths are possible at run-time, a safe assumption is that the register R1 should not be read for the next 3 cycles. Formally, this combination of information associated with some control flow paths that join at some point is performed by the meet-operation mentioned above.

The in-function mentioned above is applied to calculate the data-flow information valid at the beginning of any instruction. Its input data are the edges arriving at the node, the data-flow information valid at the nodes from where the flow of control might come, the flow function, and the meet-operation. This framework is able to calculate exact values for the data-flow information for any node in the control-flow graph, even if this graph contains arbitrary edges (introduced by jump instructions in the original assembler program), including any kind of cycles.

Mathematical Definition of the Data-Flow Equations

The algorithm for computing the data-flow information exploits some properties of an algebraic structure named lattice and is proven to produce correct results iteratively. Experience showed that it executes quite efficiently.

The "pure" algorithm as explained in textbooks like Steven S. Muchnik: Compiler Design and Implementation, Morgan Kaufman Publishers, 1997, ISBN 1-55860-320-4 does not define what kind of information certain symbols would carry, nor what operations are defined on these symbols. It is only defined that these operations must meet certain properties. Well-known instantiations of this algorithm include a number of program analysis problems performed by compilers as a prerequisite for deciding which optimizations can be performed in a certain situation.

The following sections define a lattice and a set of equations which can be solved in order to calculate the value of all data attributes in every case.

Let there be $max_R$ resources $R_i$ for which the usage must be checked:

$$R_1, \ldots, R_i, \ldots, R_{max_R} \qquad (1)$$

In a real application, these might be those pipelines of a processor which are not protected by a hardware interlock mechanism. A vector $$D = (d_1, \ldots, d_i, \ldots, d_{max_R}) \qquad (2)$$

indicates for how many cycles $d_1$ the resource $R_1$ must not be touched. The upper bound for this value is a small, positive integer number. In a particular application, this might be the depth of a pipeline.

For simplicity, let's assume that there is only one single resource to be checked and use a scalar data attribute D rather than a vector. Since the utilization of all resources can be checked independently, this is no restriction with respect to the power of the analysis algorithm proposed.

The lattice L consists, of the set of all possible values of the data attributes. For x,y∈L a meet-operation is defined as follows:

$$x \sqcap y = \max(x,y) \qquad (3)$$

The meet operation models joining control flow edges. A complete lattice definition would also contain a join operation which, however, is not needed here.

A control flow graph (CFG) contains a node for every instruction of the program being checked, and a directed edge for every possible flow of control. Some variants and how these can be exploited by the present invention is described in the section on variants below. For every node n the function PRED returns the set of all nodes from which there is a control flow edge to n. The CFG has a special node named "entry" where the program execution begins. For every node n there is a function in {n} which is used to calculate the D value available at the beginning of the node.

A flow-function F models the effect that an instruction Inst has on the data-flow information. Its definition distinguishes between instructions that newly block resources and those which don't. Let the execution of instruction Inst take c cycles. The flow function will subtract c from the value of the data attribute D if the resulting value is larger than 0 in order to model the fact that the resource that was unavailable for the next D cycles will only be unavailable for the next D–c cycles after the current instruction's execution took c cycles. However, the "unavailability information" must not become negative. The subtraction of c is therefore done by a function s which is defined as follows:

$$s(D, c) = \begin{cases} 0 & \text{if } D \leq c \\ D - c & \text{otherwise} \end{cases} \qquad (4)$$

The flow function is then defined as $$F(inst, D) = \begin{cases} c & \text{if the execution of } inst \text{ blocks} \\ & \text{the resource for } c \text{ cycles} \\ s(D, c) & \text{otherwise, let the excution of} \\ & inst \text{ take } c \text{ cycles} \end{cases} \qquad (5)$$

Associating meet-operations and a flow function, as appropriate, with every node n of the CFG creates a set of equations D=in(n) where function in is defined by $$in(n) = \begin{cases} 0 & \text{if } n \text{ is the entry} \\ \prod_{p \in PRED(n)} F(inst_p, in(p)) & \text{otherwise} \end{cases} \qquad (6)$$

where $inst_p$ denotes the instruction that is associated with node p. Here, the entry node where the program execution starts gets value zero, reflecting the fact that no resource has yet been used. For all other nodes, the respective in-value is calculated from the values associated with all incoming edges using the meet operation, and these are calculated by applying the appropriate flow function $F_{inst}$ which models the effect of the instruction in node p to the in-vector of p.

Mathematical Correctness

The iterative algorithm described above will only work correctly if the lattice meets a certain condition. The flow functions F as defined by equation (5) must be monotone with respect to the partial order defined by:

$$\forall x,y \in L: (x \sqsubseteq y) \Leftrightarrow (x \sqcap y = x) \qquad (7)$$

The definition of being monotone is $$\forall x,y \in L: (x \sqsubseteq y) \Rightarrow (F(inst,x) \sqsubseteq F(inst,y)) \qquad (8)$$

for some instruction inst. However, using equation (3), the equation (7) can be rephrased as $$\forall x,y \in L: \max(x,y)=x \Leftrightarrow \max(F(inst,x),F(inst,y))=F(inst,x) \qquad (9)$$

From the definition of the flow functions in (5) it is obvious that (9) holds.

The invention claimed is:

1. A method for solving conflicts in assembler programs, the method comprising:
   a) generating an internal representation of control flow of a source code of the assembler program by using standard techniques of compiler constructions, wherein said internal representation contains nodes for every instruction found in said source code and a directed edge for every possible flow of control between nodes;
   b) attributing data attributes to said nodes and/or said edges, wherein said data attributes are used to store the information whether the resource used by at least one instruction of said assembler program is available or for which amount of time is unavailable;
   c) applying a data-flow analysis method to said internal representation of the control flow of the source code for determining whether the resource used by at least one instruction of said assembler program is available or for which amount of time is unavailable comprising:
   c1) initializing all of said attributes of said internal representation of the control flow of the source code with an initial value;
   c2) providing access to the following input parameters:
   execution time of said instruction associated to said node;
   information on what hardware resource is used by said instruction;
   and all attributes of the nodes from which a directed edge to said node for the attribute is currently being calculated;
   c3) calculating for each of the nodes a real value for said attribute associated to said node based on said parameters;
   c4) repeating calculating step in c3) until for all attributes the newly computed real value remains unchanged;
   d) checking for each node whether the instruction accesses a resource which is not available, wherein unavailable hardware resources represents a resource conflict; and
   e) taking an appropriate action in order to overcome the resource conflict,
   wherein said calculation of the real value for each data attribute D associated with each node n is performed by evaluating the assignment D=in(n) where an entry is a node where program execution begins and function in is given as $$in(n) = \begin{cases} 0 & \text{if } n \text{ is the entry} \\ \prod_{p \in PRED(n)} F(inst_p, in(p)) & \text{otherwise} \end{cases} \quad (6)$$

and the flow function F is given as $$F(inst, D) = \begin{cases} c & \text{if the execution of } inst \text{ blocks} \\ & \text{the resource for } c \text{ cycles} \\ s(D, c) & \text{otherwise, let the execution of} \\ & inst \text{ take } c \text{ cycles} \end{cases} \quad (5)$$

which uses a function s defined as $$s(D, c) = \begin{cases} 0 & \text{if } D \le c \\ D - c & \text{otherwise} \end{cases} \quad (4)$$

and a meet operation returns the maximum value of a comparison between x and y wherein:

$$x \sqcap y = \max(x, y) \quad (3)$$

and PRED(n) is a function that returns the set of all nodes from which there is a control flow edge to n.

2. The method according to claim 1, wherein said internal representation of said control flow of the source code is represented in a form of control flow graph, wherein said nodes in control flow graph may represent basic blocks which summarize the sequence of instructions which will be executed by said control flow in a linear sequence.

3. The method according to claim 1, wherein said internal representation of said control flow of said source code is constructed according to the principles of static single assignment form.

4. The method according to claim 1, wherein said initial value of said attribute is 0.

5. The method according to claim 1, wherein said action to be taken is to present the resource conflict to a user by means of a user interface.

6. The method according to claim 1, wherein said resource conflict is presented by the line number of the instruction.

7. The method according to claim 1, wherein said calculation of said real values additionally records which instruction is the reason why a certain resource is unavailable and provides that information in addition to a resource conflict report.

8. The method according to claim 1, wherein said action to be taken is an automatic correction mechanism for repairing said conflict.

9. The method according to claim 8, wherein said automatic correction mechanism inserts an instruction which delays the execution of the instruction identified as a resource conflict for sufficiently long time to solve the conflict.

10. The method according to claim 8, wherein said correction mechanism inserts an instruction, wherein said inserted instruction belongs to said assembler program, does not use the hardware resource whose unavailability causes the problem, and the moving of said instruction does not change the semantics of said assembler program.

11. The method according to claim 8, wherein said correction mechanism inserts an instruction which belongs to instructions known by the processor, and does not change any data that are relevant for the assembler program.

12. The method according to claim 1, wherein a resource is a set of resources.

13. A data processing system comprising:
a) an assembler program in source code;
b) means for generating internal representation of control flow of the source code of the assembler program by using standard techniques of compiler constructions, wherein said internal representation contains nodes for every instruction found in said source code and a directed edge for every possible flow of control between nodes;
c) means for attributing data attributes to said nodes and/or said edges, wherein said data attributes are used to store the information whether the hardware resource used by at least one instruction of said assembler program is available or for which amount of time is unavailable;
d) means for applying a data-flow analysis method to said internal representation of the control flow of the source code for determining whether the resource used by at least one instruction of said assembler program is available or for which amount of time is unavailable, comprising:
d1) means for initializing all of said attributes of said internal representation of the control flow of the source code with an initial value;
d2) means for providing access to the following input parameters:
execution time of said instruction associated to said node;
information what hardware resource is used by said instruction;
and all attributes of the nodes from which a directed edge to said node for the attribute is currently being calculated;
d3) means for calculating for each of the node a real value for said attribute associated to said node based on said parameters;
d4) means for repeating calculation step in d3) until for all attributes the newly computed real value remains unchanged;
e) means for checking for each node whether the instruction accesses a resource which is not available, wherein unavailable resource represents a resource conflict; and
f) means for taking an appropriate action in order to overcome said resource conflict,
wherein said calculation of the real value for each data attribute D associated with each node n is performed by evaluating the assignment D=in(n) where an entry is a node where program execution begins and function in is given as $$in(n) = \begin{cases} 0 & \text{if } n \text{ is the entry} \\ \prod_{p \in PRED(n)} F(inst_p, in(p)) & \text{otherwise} \end{cases} \quad (6)$$

and the flow function F is given as $$F(inst, D) = \begin{cases} c & \text{if the execution of inst blocks} \\ & \text{the resource for } c \text{ cycles} \\ s(D, c) & \text{otherwise, let the excution of} \\ & inst \text{ take } c \text{ cycles} \end{cases} \quad (5)$$

which uses a function s defined as $$s(D, c) = \begin{cases} 0 & \text{if } D \leq c \\ D - c & \text{otherwise} \end{cases} \quad (4)$$

and a meet operation returns the maximum value of a comparison between x and y wherein:

$$x \sqcap y = \max(x, y) \quad (3)$$

and PRED(n) is a function that returns the set of all nodes from which there is a control flow edge to n.

14. The data processing system according to claim 13, wherein said action to be taken is provided by an automatic correction means for repairing said resource conflict.

15. The data processing system according to claim 14, wherein said automatic correction means inserts an operation which delays the execution of the instruction identified as a resource conflict for sufficiently long time to solve the conflict.

16. The data processing system according to claim 14, wherein said correction means inserts an instruction from said assembler program which does not use the hardware resource whose unavailability causes the problem, and the move of said instruction does not change the semantics of said assembler program.

17. A computer program product comprising:
a non-transitory, tangible storage medium readable by a processing circuit and storing instructions for execution by the processing circuit for performing a method comprising:
a) generating an internal representation of control flow of a source code of the assembler program by using standard techniques of compiler constructions, wherein said internal representation contains nodes for every instruction found in said source code and a directed edge for every possible flow of control between nodes;
b) attributing data attributes to said nodes and/or said edges, wherein said data attributes are used to store the information whether the resource used by at least one instruction of said assembler program is available or for which amount of time is unavailable;
c) applying a data-flow analysis method to said internal representation of the control flow of the source code for determining whether the resource used by at least one instruction of said assembler program is available or for which amount of time is unavailable comprising:
c1) initializing all of said attributes of said internal representation of the control flow of the source code with an initial value;
c2) providing access to the following input parameters: execution time of said instruction associated to said node; information on what hardware resource is used by said instruction;
and all attributes of the nodes from which a directed edge to said node for the attribute is currently being calculated;
c3) calculating for each of the nodes a real value for said attribute associated to said node based on said parameters;
c4) repeating calculating step in c3) until for all attributes the newly computed real value remains unchanged;
d) checking for each node whether the instruction accesses a resource which is not available, wherein unavailable hardware resources represents a resource conflict; and
e) taking an appropriate action in order to overcome the resource conflict,
wherein said calculation of the real value for each data attribute D associated with each node n is performed by evaluating the assignment D=in(n) where an entry is a node where program execution begins and function in is given as $$in(n) = \begin{cases} 0 & \text{if } n \text{ is the entry} \\ \prod_{p \in PRED(n)} F(inst_p, in(p)) & \text{otherwise} \end{cases} \quad (6)$$

and the flow function F is given as $$F(inst, D) = \begin{cases} c & \text{if the execution of inst blocks the resource for } c \text{ cycles} \\ s(D, c) & \text{otherwise, let the excution of } inst \text{ take } c \text{ cycles} \end{cases} \quad (5)$$

which uses a function s defined as $$s(D, c) = \begin{cases} 0 & \text{if } D \leq c \\ D - c & \text{otherwise} \end{cases} \quad (4)$$

and a meet operation returns the maximum value of a comparison between x and y wherein:

$$x \sqcap y = \max(x, y) \quad (3)$$

and PRED(n) is a function that returns the set of all nodes from which there is a control flow edge to n.

* * * * *